(12) United States Patent
Pettigrew et al.

(10) Patent No.: US 9,217,450 B2
(45) Date of Patent: Dec. 22, 2015

(54) KEY AND KEYWAY CONNECTORS

(75) Inventors: John Hamish Alexander Pettigrew, Tennyson (AU); Dean Osman Cameron, Maleny (AU); Thomas David Percy, Windsor (AU)

(73) Assignee: JOINLOCK PTY. LTD., Queensland (AU)

( * ) Notice: Subject to any disclaimer, the term of this patent is extended or adjusted under 35 U.S.C. 154(b) by 247 days.

(21) Appl. No.: 13/806,350

(22) PCT Filed: Jun. 21, 2011

(86) PCT No.: PCT/AU2011/000759
§ 371 (c)(1),
(2), (4) Date: Dec. 21, 2012

(87) PCT Pub. No.: WO2011/160173
PCT Pub. Date: Dec. 29, 2011

(65) Prior Publication Data
US 2013/0097846 A1    Apr. 25, 2013

(30) Foreign Application Priority Data
Jun. 22, 2010    (AU) ................................ 2010902740

(51) Int. Cl.
*B23P 11/00*    (2006.01)
*F16G 11/00*    (2006.01)
*F16B 3/04*    (2006.01)
(Continued)

(52) U.S. Cl.
CPC .................. *F16B 3/04* (2013.01); *A47B 47/042* (2013.01); *F16B 5/0036* (2013.01); *F16B 5/07* (2013.01); *F16B 12/125* (2013.01); *F16B 12/22* (2013.01); *F16B 12/34* (2013.01); *A47B 2230/0062* (2013.01); *Y10T 29/49826* (2015.01); *Y10T 29/49948* (2015.01)

(58) Field of Classification Search
USPC ............... 29/525.02, 453, 450, 451; 403/309, 403/310, 311, 313, 359.1, 359.5
See application file for complete search history.

(56) References Cited

U.S. PATENT DOCUMENTS 749,391 A * 1/1904 Lutz ............................... 403/313
2,398,436 A * 4/1946 Mason .......................... 220/752
(Continued)

FOREIGN PATENT DOCUMENTS

CN    2823635    10/2006
CN    201190711 Y    2/2009
(Continued)

OTHER PUBLICATIONS

International Search Report for PCT/AU2011/000759, mailed Aug. 8, 2011.
(Continued)

*Primary Examiner* — Essama Omgba
(74) *Attorney, Agent, or Firm* — Nixon & Vanderhye P.C.

(57) ABSTRACT

A method of mechanically connecting two or more components together comprises the steps of: i. mounting an elongate keyway connector (10) comprising regularly spaced keyways (13) to a first component wherein the keyways (13) provide a longitudinal keyway passage (16); ii. mounting at least one elongate key connector (11) comprising regularly spaced keys (14) to a second component; and iii. extending the keys (14) longitudinally within the keyway passage (16) and engaging the keyways (13) with the keys (14) to connect the first and second components together.

20 Claims, 8 Drawing Sheets

(51) Int. Cl.
*A47B 47/04* (2006.01)
*F16B 5/00* (2006.01)
*F16B 12/12* (2006.01)
*F16B 5/07* (2006.01)
*F16B 12/22* (2006.01)
*F16B 12/34* (2006.01)

(56) References Cited

U.S. PATENT DOCUMENTS

| | | | | |
|---|---|---|---|---|
| 2,654,115 | A * | 10/1953 | Kafer | 16/421 |
| 3,313,587 | A * | 4/1967 | Mongesku et al. | 312/333 |
| 3,750,267 | A * | 8/1973 | Otto | 29/507 |
| 3,777,435 | A * | 12/1973 | Perina | 52/586.1 |
| 3,932,016 | A | 1/1976 | Ammenheuser | |
| 3,999,278 | A * | 12/1976 | Loskill | 29/450 |
| 4,079,499 | A * | 3/1978 | Clerici Bagozzi | 29/453 |
| 4,172,000 | A * | 10/1979 | Horike et al. | 156/108 |
| 4,649,679 | A * | 3/1987 | Arens | 52/181 |
| 4,683,634 | A * | 8/1987 | Cole | 29/412 |
| 4,944,072 | A | 7/1990 | Robson | |
| 5,070,584 | A | 12/1991 | Dais et al. | |
| 5,133,472 | A * | 7/1992 | Koda et al. | 220/769 |
| 5,189,779 | A * | 3/1993 | Fishel et al. | 29/453 |
| 5,216,780 | A * | 6/1993 | Lutzke et al. | 16/421 |
| 5,279,443 | A * | 1/1994 | Koda et al. | 220/769 |
| 5,503,573 | A * | 4/1996 | Sagawa | 439/752 |
| 5,522,206 | A * | 6/1996 | Moncrief et al. | 53/543 |
| 5,638,973 | A | 6/1997 | Dewey et al. | |
| 5,782,657 | A * | 7/1998 | Wolla et al. | 439/595 |
| 5,984,566 | A * | 11/1999 | Blaha | 403/364 |
| 6,035,514 | A * | 3/2000 | Dean | 29/453 |
| 6,398,585 | B1 * | 6/2002 | Fukuda | 439/587 |
| 6,487,759 | B1 | 12/2002 | Akeno et al. | |
| 6,638,109 | B2 * | 10/2003 | Kurimoto et al. | 439/595 |
| 6,823,562 | B1 * | 11/2004 | Smith et al. | 16/421 |
| 6,916,220 | B2 | 7/2005 | Davey et al. | |
| 7,025,645 | B1 | 4/2006 | Hsieh | |
| 7,628,648 | B1 * | 12/2009 | Tan Chin Yaw et al. | 439/595 |
| 7,805,813 | B1 * | 10/2010 | Bunyard | 16/425 |
| 7,841,913 | B2 * | 11/2010 | Hitchcock et al. | 439/752 |
| 8,262,308 | B2 * | 9/2012 | Peng | 403/20 |
| 9,016,730 | B2 * | 4/2015 | Cameron et al. | 285/330 |
| 9,051,946 | B2 * | 6/2015 | Cameron et al. | 1/1 |
| 2007/0039151 | A1 * | 2/2007 | Crawley | 29/401.1 |
| 2010/0111599 | A1 | 5/2010 | Baur et al. | |
| 2010/0260543 | A1 * | 10/2010 | Cameron et al. | 403/355 |
| 2011/0309667 | A1 | 12/2011 | Stiller et al. | |
| 2012/0000060 | A1 * | 1/2012 | Cameron et al. | 29/525.01 |
| 2013/0180437 | A1 * | 7/2013 | Wilcox et al. | 108/56.3 |
| 2013/0239391 | A1 * | 9/2013 | Pettigrew et al. | 29/428 |
| 2013/0312351 | A1 * | 11/2013 | Bergevin et al. | 52/456 |

FOREIGN PATENT DOCUMENTS

| | | |
|---|---|---|
| CN | 201 225 352 | 4/2009 |
| DE | 4236919 | 5/1994 |
| DE | 94 19 199 | 1/1995 |
| DE | 100 56 666 | 5/2001 |
| DE | 102004016890 | 11/2005 |
| EP | 1 989 956 A2 | 11/2008 |
| FR | 2784721 | 4/2000 |
| FR | 2934022 | 1/2010 |
| WO | WO 2008/151368 | 12/2008 |
| WO | WO 2012/061900 | 5/2012 |
| WO | WO 2012/096639 | 7/2012 |

OTHER PUBLICATIONS

Written Opinion of the International Searching Authority for PCT/AU2011/000759, mailed Aug. 8, 2011.
International Preliminary Report on Patentability with 5 Amended Sheets, dated Feb. 21, 2012.
EP Search Report, Appln. No. 11797387.5 (Oct. 9, 2013).

* cited by examiner

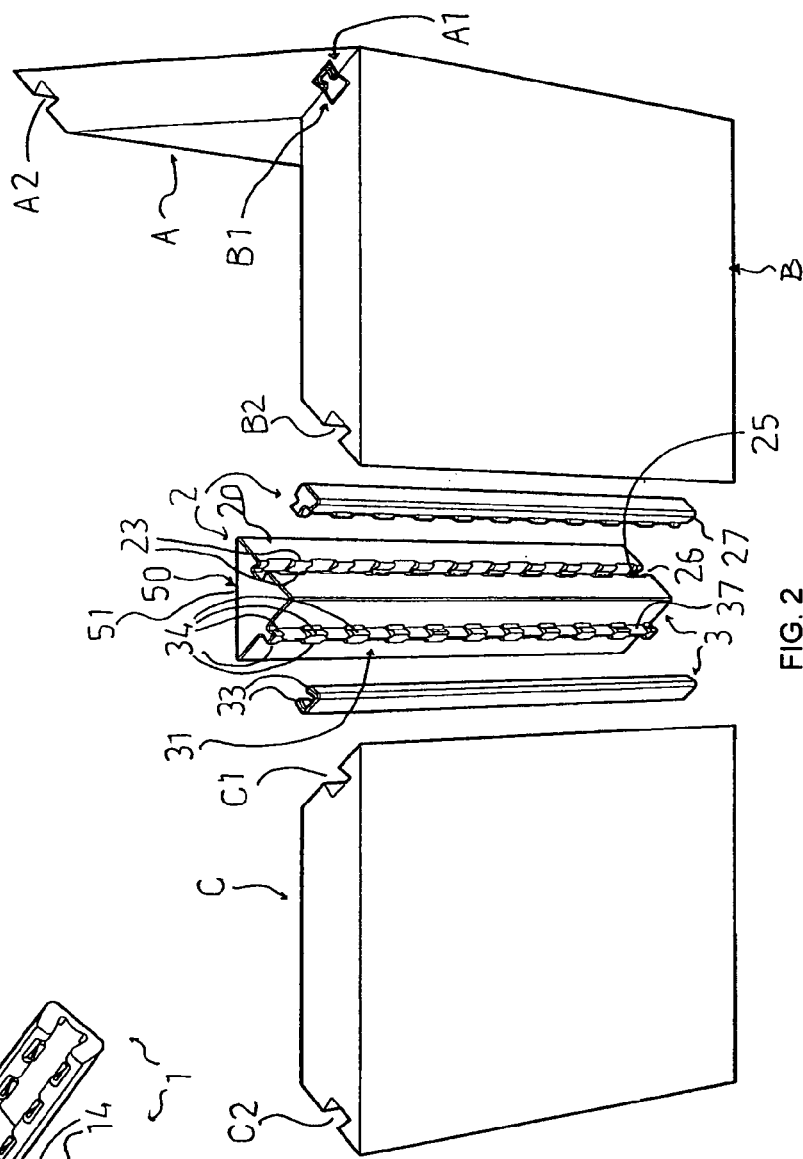
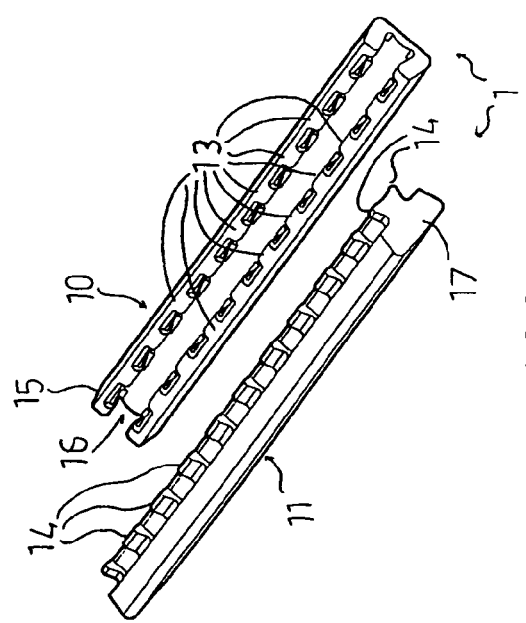
FIG. 2
FIG. 3

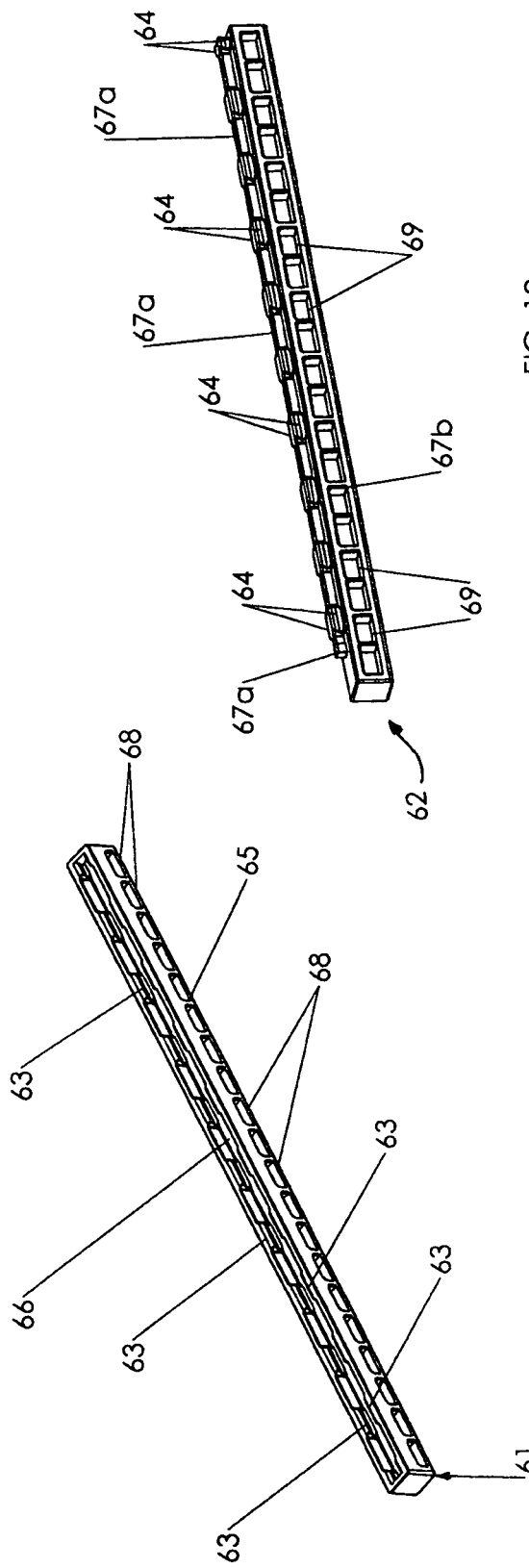
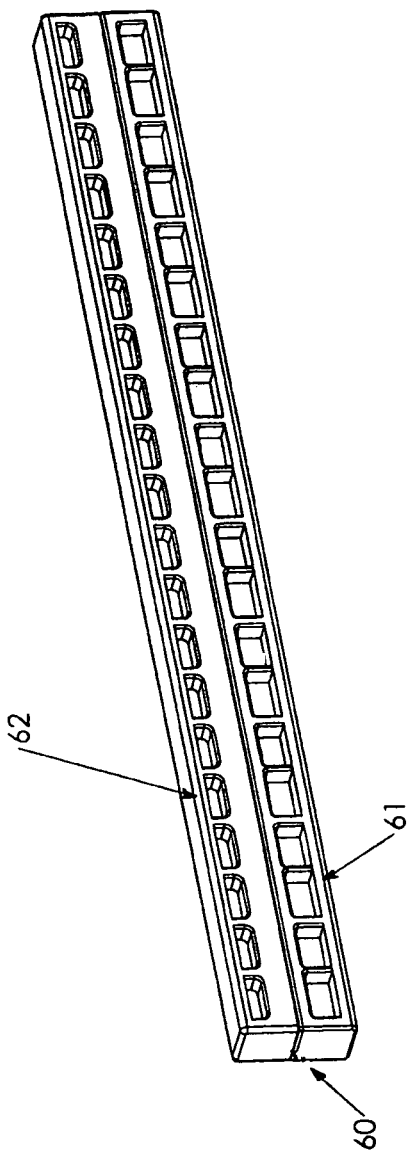
FIG. 11
FIG. 12
FIG. 13

KEY AND KEYWAY CONNECTORS

This application is the U.S. national phase of International Application No. PCT/AU2011/000759, filed 21 Jun. 2011, which designated the U.S. and claims priority to Australia Application No. 2010902740, filed 22 Jun. 2010, the entire contents of each of which are hereby incorporated by reference.

FIELD OF THE INVENTION

This invention concerns, inter alia, a method for mechanically connecting two or more components or component regions together. In one aspect, the invention concerns key and keyway connectors that are each mountable to a component and, once mounted, can connect the components or different regions of the one component together. In another aspect, the invention concerns key and keyway connectors that are themselves part of a component or components.

BACKGROUND OF THE INVENTION

The construction of furniture, cabinetry, display and storage units and like structures usually entails connecting components together with glue, adhesives, nails, screws, bolts, rivets staples as well as other types of fasteners. This can be problematic as it can be time-consuming, labour-intensive and require the use of specialist tools and labor.

Flat-pack and ready-to-assemble designed furniture goes some way to overcome the above-mentioned problems, but such furniture has its own problems in that the connections formed between components can be of inadequate strength and can be held together by point loads. Also, for tongue in groove arrangements/dovetail joints, the components must be made of wood (timber or particle board).

Furthermore, the same above-mentioned problems are commonplace in existing panel, modular, temporary and prefabricated construction methods for buildings and structures as well as rigid and flexible construction materials. Industrial, processing and materials-handling, storage and packaging applications and equipment such as replaceable strips, plates, panels, piping and other such replaceable items that wear out during operation or use also require convenient and/or reusable connecting systems.

SUMMARY OF THE INVENTION

It is an object of the present invention to provide a method for mechanically connecting two or more components together or two regions of the one component together.

An alternative object of the present invention is to provide a method for mechanically connecting two or more components together or two regions of the one component together that minimises or overcomes at least one of the problems described above, or to provide the public with a useful or commercial choice.

An alternative object of the present invention is to provide a connector assembly for mechanically connecting two or more components together or two regions of the one component together.

An alternative object of the present invention is to provide a connector assembly or component assembly that minimises or overcomes at least one of the problems described above, or to provide the public with a useful or commercial choice.

Yet other objects of the present invention will become evident from other parts of this specification in so far as the advantages that the present invention may provide.

According to a first aspect of the present invention, there is provided a connector assembly comprising an elongate keyway connector and an elongate key connector, wherein the keyway connector comprises regularly spaced keyways that provide a longitudinal keyway passage and the key connector comprises regularly spaced keys that extend longitudinally within the keyway passage and engage the keyways to lock the connectors together.

According to a second aspect of the present invention, there is provided a connector assembly comprising at least one elongate keyway connector mountable to or part of at least a first component and at least one key connector mountable to or part of at least a second component, wherein the keyway connector comprises regularly spaced keyways that provide a longitudinal keyway passage and the key connector comprises regularly spaced keys that extend longitudinally within the keyway passage and engage the keyways to lock the first and second components together.

According to a third aspect of the present invention, there is provided a connector assembly comprising at least one elongate keyway connector and at least one key connector mountable to different regions of a component, wherein the keyway connector comprises regularly spaced keyways that provide a longitudinal keyway passage and the key connector comprises regularly spaced keys that extend longitudinally within the keyway passage and engage the keyways to lock the different regions of the component together.

According to a fourth aspect of the present invention, there is provided a connector assembly comprising at least one component comprising at least one elongate keyway connector located at at least a first region of the component and at least one key connector located at at least a second region of the component, wherein the keyway connector comprises regularly spaced keyways that provide a longitudinal keyway passage and the key connector comprises regularly spaced keys that extend longitudinally within the keyway passage and engage the keyways to lock the first and second regions of the component together.

According to a fifth aspect of the present invention, there is provided a method of mechanically connecting two or more components together, said method comprising the steps of:

mounting at least one elongate keyway connector comprising regularly spaced keyways to at least a first component wherein the keyways provide a longitudinal keyway passage;

mounting at least one elongate key connector comprising regularly spaced keys to at least a second component; and extending the keys longitudinally within the keyway passage and engaging the keyways with the keys to connect the first and second components together.

According to a sixth aspect of the present invention, there is provided a method of mechanically connecting at least two different regions of a component together, said method comprising the steps of:

mounting at least one elongate keyway connector comprising regularly spaced keyways to at least a first region of the component wherein the keyways provide a longitudinal keyway passage;

mounting at least one elongate key connector comprising regularly spaced keys to at least a second region of the component; and extending the keys longitudinally within the keyway passage and engaging the keyways with the keys to connect the first and second regions of the component together.

According to a seventh aspect of the present invention, there is provided an elongate keyway connector comprising regularly spaced keyways that provide a longitudinal keyway passage when used for the method according to the fifth or sixth aspects of the present invention.

According to an eighth aspect of the present invention, there is provided an elongate key connector comprising regularly spaced keys when used for the method according to the fifth or sixth aspects of the present invention.

According to a ninth aspect of the present invention, there is provided a component assembly comprising a connector assembly and at least first and second components, wherein the connector assembly comprises at least one elongate keyway connector mounted to the first component and at least one key connector mounted to the second component, wherein the keyway connector comprises regularly spaced keyways that provide a longitudinal keyway passage and the key connector comprises regularly spaced keys that extend longitudinally within the keyway passage and engage the keyways to lock the first and second components together.

According to a tenth aspect of the present invention, there is provided a component assembly comprising a connector assembly and at least one component, wherein the connector assembly comprises at least one elongate keyway connector mounted to at least a first region of the component and at least one key connector mounted to at least a second region of the component, wherein the keyway connector comprises regularly spaced keyways that provide a longitudinal keyway passage and the key connector comprises regularly spaced keys that extend longitudinally within the keyway passage and engage the keyways to lock the first and second regions of the component together.

DETAILED DESCRIPTION OF THE INVENTION

It is to be understood that the following detailed description of the invention generally applies to all ten aspects of the invention as defined in the summary section, unless the context provides otherwise.

As mentioned in the summary section above, the keyway connector and/or the key connector can be mountable to or part of at least one component. In one embodiment, the keyway connector can be mountable to a first component and the key connector can be mountable to a second component and the keys can be engagable with the keyways to lock the first and second components together to form a joint. In another embodiment, the keyway connector and the key connector can be mountable to different regions of the one component. In yet another embodiment, the keyway connector and/or the key connector can be part of, including integrally formed as part of, at least one component, including the one and the same component.

The keyway connector can be of any suitable size, shape and construction, and can be made of any suitable material or materials. Plastics material and metal (e.g. aluminium or steel) are, for example, suitable materials. In fact, any material that can be moulded, cast, pressed, formed, machined or extruded can be a suitable material. The keyway connector can be fabricated in any desired length and can be cut or snapped to length prior to or after being mounted to a component.

The keyway connector can comprise any suitable number of keyways and the keyways can be of any suitable size, shape and construction, provided that they can provide a longitudinal keyway passage as well as engage the keys of the key connector so as to lock the components together or lock different regions of the one component together to form a secure joint. Preferably at least one keyway engages and retains at least one key. More preferably the keyway engage and retain the key. At least one keyway can be in the form of a hook and at least one key can shaped so as to be retained by that hook. In a preferred embodiment, each keyway is in the form of a hook and each key is shaped so as to be retained by the hook.

Each keyway can have a connector-support portion and a key-retaining portion. The connector-support portion can extend alongside and further beneath the key connector and the key-retaining portion can extend around a key. The key-retaining portion can be arcuate, angular or both, for example.

The keyway connector can comprise an elongate keyway body having a longitudinal axis and a plurality of keyways spaced at regular intervals relative to one another along opposing longitudinal sides of the keyway body. This clearance between the longitudinal sides can provide the longitudinal keyway passage. The keyways can be spaced such that a width of an interval between adjacent keyways of a longitudinal side of the keyway body is substantially of the same width as a width of each adjacent keyway (ie. one pitch length).

The keyways can be spaced as opposing pairs relative to the longitudinal axis of the keyway body or the keyways can be spaced as non-opposing pairs relative to the longitudinal axis of the keyway body—that is, they can have a staggered/offset/alternating spacing. An individual key can engage and be retained by a pair of opposed keyways.

The keyway body can be of unitary construction or can comprise separate connectable pieces. If separate connectable pieces, the pieces can be hingedly connected to one another or not. The keyway body can be made of relatively inflexible material or flexible material. The keyway body can extend linearly or other than linearly. For example, the keyway body can be substantially linear or arcuate when viewed in plan. If flexible, it is possible that the keyway body can be bent into an appropriate longitudinal shape. If of unitary construction, the keyway body can be fabricated with weakened regions/lines such that adjacent longitudinal regions can be broken apart. The keyway body can be fabricated with a scale or measure so that the length of the keyway body can be readily determined and cut/broken to length, if required.

The keyway connector can comprise a structural component extending from or along the keyway body. This structural component can be, for example, planar, angular, bent, arcuate, convex, concave, annular, discoid, cylindrical, rectangular or of any other simple or complex geometry. This structural component can connect with, retain or strengthen another said component.

The key connector can be of any suitable size, shape and construction, and can be made of any suitable material or materials. Plastics material and metal (e.g. aluminium or steel) are, for example, suitable materials. In fact, any material that can be moulded, cast, pressed, formed, machined or extruded can be a suitable material. The key connector need not be made of the same material as the keyway connector, nor the first and second components. The key connector can be fabricated in any desired length and can be cut to length prior to or after being mounted to a component.

The key connector can comprise an elongate key body having a longitudinal axis and a plurality of keys spaced at regular intervals relative to one another along opposing longitudinal sides of the key body that are retainable by the keyways. The keys can be spaced such that a width of an interval between adjacent keys of a longitudinal side of the key body is substantially of the same width as a width of each adjacent key (ie. one pitch length).

The keys can be spaced as opposing pairs relative to the longitudinal axis of the key body or the keys can be spaced as non-opposing pairs relative to the longitudinal axis of the key body—that is, they can have a staggered/offset/alternating spacing.

The key body can be of unitary construction or can comprise separate connectable pieces. The key body can be made of relatively inflexible material or flexible material. The key body can extend linearly or other than linearly. For example, the key body can be substantially linear or arcuate when viewed in plan. If flexible, it is possible that the key body can be bent into an appropriate longitudinal shape.

If the key body is made of separate connectable pieces, the pieces can be hingedly connected to one another or not. An end of a first key connector piece can interference fit with an end of an adjacent second key connector piece. Alternatively, one end of an annular key connector can interference fit with the other end of the same connector. If of unitary construction, the key body can be fabricated with weakened regions/lines such that adjacent longitudinal regions can be broken apart. The key body can be fabricated with a scale or measure so that the length of the key body can be readily determined and cut/broken to length, if required.

Preferably, each longitudinal side of the key body has a plurality of keys extending within the same plane and the keys are spaced apart from one another in accordance with the spacing of the keyways. With the keys in this arrangement, the keys can be slid within the keyway passage into locking engagement with the keyways or slid out of locking engagement with the keyways. If the keyways are in the form of hooks, then the keys can be removed from the keyway passage in a lateral direction when not in locking engagement with the keyways. This can be achieved by moving each key along the keyway passage to a space between adjacent keyways (ie. one pitch length).

The key connector can comprise a handle, lobe or grip surface extending from or along the key body. The key connector can have any suitable type of handle. The handle can extend almost the length of the key body but for some applications it can be located at or near one end only. The handle can have openings for fingers (or basic tool) located between an upper surface of the handle and an upper surface of the key body. The handle can be removable or engage with a variety of gripping surfaces that can be formed onto a suitable face of the key connector.

Alternatively or additionally, the key connector can comprise a structural component extending from or along the key body. This structural component can be, for example, planar, angular, bent, arcuate, convex, concave, annular, discoid, cylindrical, rectangular or of any other simple or complex geometry. This structural component can connect with, retain or strengthen another said component.

As mentioned, the keyway connector can be mountable to a component and the key connector can be mountable to a component, and this can be achieved in any suitable way. That is, the keyway connector and key connector can each comprise at least one mount and the mount can be, for example, in the form of one or more of the following: a friction fit groove arrangement, a tongue in groove arrangement (friction fit or not), a stepped, barbed or serrated tapered face (to increase friction fit strength), a fastener such as a nail, screw, bolt, rivet or staple, or an adhesive such as glue or a double-sided adhesive strip. If in a tongue in groove arrangement, the keyway body or key body can be in the form of a wedge-shaped tongue (when viewed on end) that is received within a suitably tapered groove in a component. Of course, alternatively the groove can extend along and within the keyway body or key body and the tongue can be provided by the component.

The keyway connector and key connector can be mounted to a face, surface, edge, perimeter and/or periphery of a component. As already mentioned, the keyway connector and key connector can mount within a groove, pocket or a fold of a component.

Each component can be of any suitable size, shape and construction. Each component can be rigid, semi-rigid or flexible and can be made of any suitable material or materials. The component can be planar, angular, bent, arcuate, convex, concave, annular, discoid, cylindrical, tubular, rectangular or of any other simple or complex geometry. The component can be, for example, a panel, beam, tube, pipe, film, fabric, cloth, mesh, textile, netting, membrane, container, closure for the container, cylindrical wall section of a tank, base or roof connectable to the wall section of the tank, slip flange assembly for holding pipes or tubes in general together, or strip, plate, panel screen or lining section, part or assembly for structures or equipment used in industrial processing, mineral processing, mill liners, excavation tool or equipment or materials handling equipment or similar applications. This list is not exhaustive and other general component types are mentioned elsewhere in this specification as well as in the applicant's other published applications, including PCT/AU2008/000839 and PCT/AU2010/000240.

As mentioned, the key connector and/or keyway connector can be part of, including an integral part of, a component. Such a component can be moulded, cast, pressed, formed, machined or extruded, for example.

More than two components can be connected together. More than one keyway connector or key connector can be mounted to a component at any angle. This would allow a component to be directly connected to two or more other components at the same time, thus enabling an endless number of complex structures to be assembled.

The keyway and key connector can engage so that they can be releasably unlocked or they can engage so that they cannot be unlocked without destroying the joint. This can be achieved in any suitable way. They can also engage such that the keyway connector can be reversibly fixed or held to prevent it accidentally unlocking with stress cycling. A lofted keyway profile can be used to achieve this or alternatively any number of other methods that will be obvious to those skilled in the art can be used, e.g. insertable keys, snap-fit connectors, tabs, grub screws or adhesive.

The connecting method according to the fifth and sixth aspects can comprise the step of connecting the components together or different regions of the one component together using a further connecting mechanism. Such a mechanism can include mating male and female regions, such as, for example, a key and keyway arrangement, a tongue in groove arrangement, a snap-fit arrangement, a pin and hole arrangement and so forth being located between abutting faces or edges of the component/s.

The connecting method according to the fifth or sixth aspects can further comprise the step of introducing a sealing member between the components or component regions before connecting them together, so as to render the connection fluid-tight. Any suitable type of sealing member can be used (e.g. a gasket or O-ring or other profile seal). A sealing member can be extended along abutting faces or edges of the components or of the one and same component.

Alternatively, abutting faces or edges of the components themselves (or component itself) can be shaped to provide a sealing function. For example, one or more of the components can have an integrally formed (eg. moulded) sealing member or profile to enable improved sealing of the joint.

Preferably, the keyway body and key body are mounted to a component by way of a tongue in groove arrangement. The keyway body and key body can each be received as a longitudinal tongue within a longitudinal groove in a component—or vice versa. The longitudinal groove and the keyway body and key body can be tapered, arcuate, round, oval, square or irregular shaped to retain the components in the corresponding groove. The keyway body and key body can each be wedge-shaped when viewed in cross-section and each can be received within a suitably tapered groove in the component. The keyway body and key body can each be arcuate when viewed in side elevation and each can be received within a suitably shaped arcuate groove in the component that may have been formed using a cutting wheel. For clarity, the keyway, connector and key connector can each comprise a mount comprising a tongue in groove arrangement (friction fit) and/or in combination with a fastener or adhesive, for example, for fixedly retaining each body within each groove.

In one embodiment of the invention, the keyway connector and key connector can each extend the entire length of the join. In another embodiment, a regularly spaced/stitched join can be achieved by having the keyway connector extend the entire length of the desired join with more than one (shorter) key connector extending along the joint (or vice-versa). In yet another embodiment, regularly spaced keyway and key connectors of shorter length than the join can extend along the join so as to provide enough strength to secure the entire length of the desired join. That is, with regard to the latter embodiments, any one join can be formed by more than one keyway connector and/or key connector, and the more than one keyway connectors need not extend end-to-end with each other, and the more than one key connectors need not extend end-to-end with each other.

In a first embodiment, the first and second components are in the form of panels or beams that are connectable edge to edge, face to face or end to end such that they extend substantially in the same plane or at different angles relative to one another. The connectors can extend along an edge, face or end of each panel or beam. The connectors can be used for butt joining components together or for forming mitered joints (ie. for components having beveled edges), or both. In this embodiment, any suitable number of additional panels or beams can be connected to the first and second components so as to form, for example, floors, plates, panels, screens or strips, form-work, scaffolding, architectural beams, cabinetry, displays, shop fit-outs, storage, packaging and materials handling applications, shelters, playground equipment, and other types of building elements, furniture or structures.

In a second embodiment, the first and second components are in the form of panels that are hingedly connected together along a fold line, whereby a beveled edge of each panel is brought together about the fold line such that keyway and key connectors mounted within grooves in those edges can be connected together to form a mitered joint. For example, panels with 45° beveled edges can be folded and connected together to form a fixed 90° joint between the panels. For example, four panels can be hingedly connected together along respective fold lines such that the panels can be folded into a rectangular prism. For example, three panels can be hingedly connected together along respective multiple fold lines to form a triangular prism. For example, six panels can be hingedly connected together along respective fold lines to form a hexagonal prism. All types of irregular shapes and complex or simple symmetrical and non-symmetrical shapes are possible including, for example, star shapes. Such panels can comprise timber composite/particle, insulated or plastic board panels that are surface (plastic) laminated and the laminate extending between the panels provides the hinge/fold line.

In a third embodiment, the first or second component can be in the form of a container and the other component can be in the form of a closure for the container. The connectors can extend along a circumference of the container and closure.

In a fourth embodiment, the first or second component can be in the form of a cylindrical wall section of a tank and the other component can be in the form of discoid base or roof connectable to the wall section of the tank. The connectors can extend along a circumference of the wall section and base or roof. In this embodiment, another component in the form of a cylindrical wall section of the tank can be connectable to a free end of the other wall section, by way of another set of annular connectors.

In a fifth embodiment, the components are in the form of a slip flange assembly, for holding pipes or tubes in general together. One or more of the components can be arcuate, circular, annular or tubular and a keyway or key connector can extend along its circumference. The pipe or tube can have a flange or not. If it does have a flange, the flange and pipe or tube can be of unitary construction or the flange can be attachable to an end of the pipe or tube. The keyway or key connector can be annular or a split ring structure. The keyway or key connector can be in the form of a collar that is attachable to or detachable from the end of the respective pipe or tube, whether the pipe or tube is flanged or not.

In a sixth embodiment, the first or second component can be in the form of a replaceable strip, plate, panel screen or lining section and the other component can be in the form of a part or assembly for structures or equipment used in industrial processing, mineral processing, mill liners, excavation tool or equipment or materials handling equipment or similar applications, for example.

In a seventh embodiment, the first or the second component may be rigid, semi-rigid or flexible and may be in the form of a film, fabric, cloth, mesh, textile, netting or membrane for use in shade and weather structures, shelters, covers, enclosures, surface and sea transport covers, storage covers, horticultural and agricultural and industrial structures, tents, tanks and dam liners and similar containment applications.

In another embodiment of the invention, the keyway connector and key connector can be of unitary (hybrid) construction, being of substantially equivalent lengths and being connected end to end such that the one hybrid piece can serve as both a keyway connector and key connector and connect with a like hybrid piece.

In another embodiment of the invention, the keyway connector and key connector can again be of unitary (hybrid) construction, such that it serves as an adaptor, to engage with keyway and key connectors that are mounted to one or more other components. It is possible that an adaptor could have two or more keyway connectors and two or more key connectors.

In another embodiment, for any one or more of the embodiments described above, a groove of any suitable sectional shape for receiving a key or keyway connector can be cut or molded into a component such that it extends to opposing edges or ends of the component, such that the groove is visible once the component has been connected together with another component and the joint has been made.

Alternatively, for any one or more of the embodiments described above, a groove of any suitable sectional shape for receiving a key or keyway connector can be cut or molded into a component short of the edges or ends of the component, such that the groove is not visible once the component has been connected together with another component and the joint has been made. That is, a semi-flexible key connector and keyway connector can be fitted into a respective groove (eg. such as a tapered groove) to produce an aesthetically pleasing result as the connectors and grooves will no longer be visible. This connecting mechanism also provides the advantage of preventing the key connector and keyway connector from sliding out of position during assembly, cyclic loading during life of the assembly, or during disassembly.

Particularly preferred embodiments of the invention will now be described by way of example with reference to the accompanying figures.

BRIEF DESCRIPTION OF THE FIGURES

FIG. 2 is the same as FIG. 1 but shown in perspective (underside) and showing components A and B connected together.

FIG. 3 is an enlarged perspective view of a connector assembly used to connect components A and B of FIG. 1 together.

FIG. 4 is an end view of the three panel components and connector assemblies shown in FIG. 1 when connected together.

FIG. 5 is the same as FIG. 1 but shown in perspective.

FIG. 11 is a perspective view of a keyway connector of a connector assembly (shown in FIG. 13) that is used to connect one or more components together, according to an embodiment of the present invention.

FIG. 12 is a perspective view of a key connector for use with the keyway connector shown in FIG. 11, according to an embodiment of the present invention.

FIG. 13 is a perspective view of a connector assembly comprising the keyway connector of FIG. 11 and the key connector of FIG. 12, when connected together.

DESCRIPTION OF THE PREFERRED EMBODIMENTS

Figure 1:
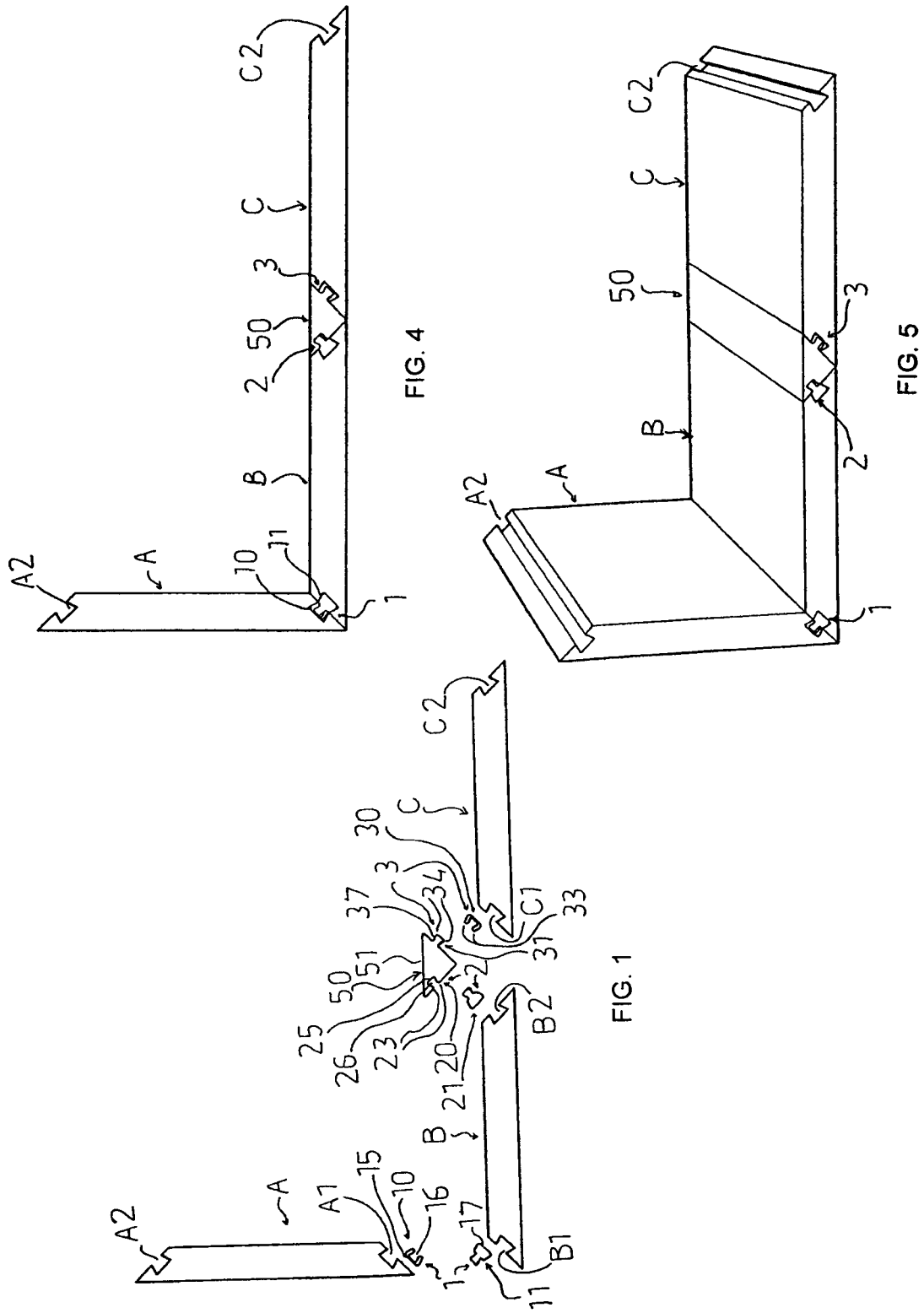
FIG. 1 is an end view of panel components A, B and C that are to be connected together using three connector assemblies, according to an embodiment of the present invention.

In the figures, like reference numerals refer to like features. FIGS. 1-3 show panel components A, B and C that are to be connected together using connector assemblies 1, 2, 3, according to an embodiment of the present invention.

Wooden panel components A, B and C each have beveled edges (45° miter) that can be connected together with connector assemblies 1, 2 and 3. A tapered groove A1, A2, B1, B2, C1, C2 extends along and within each beveled edge of A, B and C.

Connector assembly 1 comprises an elongate keyway connector 10 made of injection moulded plastics material and an elongate key connector 11 made of injection moulded plastics material. The keyway connector 10 comprises regularly spaced keyways 13 (only some of which are labeled) and the key connector comprises regularly spaced keys 14 (only some of which have been labeled) that engage the keyways 13 to lock the connectors 10, 11 together to form a secure joint. Each keyway 13 is in the form of a hook and each key 14 is shaped so as to be retained by the hook. The keyway connector 10 comprises an elongate keyway body 15 having a longitudinal axis and the keyways 13 spaced at regular intervals relative to one another along opposing longitudinal sides of the keyway body 15 that provide a longitudinal keyway passage 16. The keyway body 15 is wedge-shaped/tapered when viewed on end. The keyways 13 are spaced such that a width of an interval between adjacent keyways 13 of a longitudinal side of the keyway body 15 is substantially of the same width as a width of each adjacent keyway 13 (ie. one pitch length). The keyways 13 are spaced as opposing pairs relative to the longitudinal axis of the keyway body 15.

The key connector 11 comprises an elongate key body 17 having a longitudinal axis and the keys 14 spaced at regular intervals relative to one another along opposing longitudinal sides of the key body 17 that are retainable by the keyways 13. The key body 17 is wedge-shaped/tapered when viewed on end. The keys 14 are spaced such that a width of an interval between adjacent keys 14 of a longitudinal side of the key body 17 is substantially of the same width as a width of each adjacent key 14 (ie. one pitch length). The keys 14 are spaced as opposing pairs relative to the longitudinal axis of the key body 17.

Each longitudinal side of the key body 17 has the keys 14 extending within the same plane and the keys 14 are spaced apart from one another in accordance with the spacing of the keyways 13. With the keys 14 in this arrangement, the keys 14 can be slid into locking engagement with the keyways 13 or slid out of locking engagement with the keyways 13. The keys 14 can be removed from the keyway passage 16 in a lateral direction when not in locking engagement with the keyways 13. This can be achieved by moving each key 14 along the keyway passage 16 to a space between adjacent keyways 13 (ie. one pitch length).

The keyway connector 10 is mounted within tapered groove A1 by way of a friction fit and/or adhesive (glue)

and/or other fastener between the keyway body 15 and the groove A1. Likewise, the key connector 11 is mounted within tapered groove B1 by way of a friction fit and/or adhesive (glue) and/or other fastener between the key body 17 and the groove B1.

In order to connect panel components A and B together to form a mitered joint as seen in FIGS. 4 and 5, firstly the keyway and key connectors 10, 11 are mounted within the tapered grooves A1, B2. The keys 14 are then extended into the keyway passage 16 and slid along the keyway passage 16 one pitch length until the keyways 13 engage and retain the keys 14 to form a secure joint. If desired, the components A, B can be further glued or otherwise fastened together.

Panel components B and C are connected together with connector assemblies 2 and 3. Instead of B and C forming a mitered joint, they instead form a flat joint because parts of connector assemblies 2 and 3 have been fabricated in the form of a unitary angle adaptor 50.

Connector assembly 2 comprises an elongate keyway connector 20 that is part of the angular adaptor 50 and an elongate key connector 21 that is just like key connector 11. The keyway connector 20 comprises regularly spaced keyways 23 just like keyway connector 10.

Connector assembly 3 comprises an elongate keyway connector 30 that is just like keyway connector 10 and an elongate key connector 31 that is part of the angular adaptor 50. The key connector 31 comprises regularly spaced keys 34 just like key connector 11.

The keyway connector 20 comprises an elongate keyway body 25 having a longitudinal axis and keyways 23 spaced at regular intervals relative to one another along opposing longitudinal sides of the keyway body 25 that provide a longitudinal keyway passage 26. The key connector 31 also comprises an elongate key body 37 having a longitudinal axis and keys 34 spaced at regular intervals relative to one another along opposing longitudinal sides of the key body 37 that are retainable by keyways 33 of keyway connector 30.

The keyway body 25 together with the key body 37 form the triangular shape of the angle adaptor 50, and a hypotenuse 51 of the adaptor 50 provides a flat surface when panel components B and C are connected together to form a secure joint as seen in FIGS. 4 and 5—the connection being made substantially as described for connector assembly 1.

In order to connect panel components B and C together to form a flat joint as seen in FIGS. 4 and 5, firstly the keyway and key connectors 30, 21 are mounted (friction fit and/or adhesive (glue) and/or other fastener) within the tapered grooves C1 and B2. Both sets of keys are then extended into both sets of keyway passages and slid along the keyway passages one pitch length until the keyways engage and retain the keys to form secure joints. If desired, components B and C can be further glued or otherwise fastened together.

Figure 6:
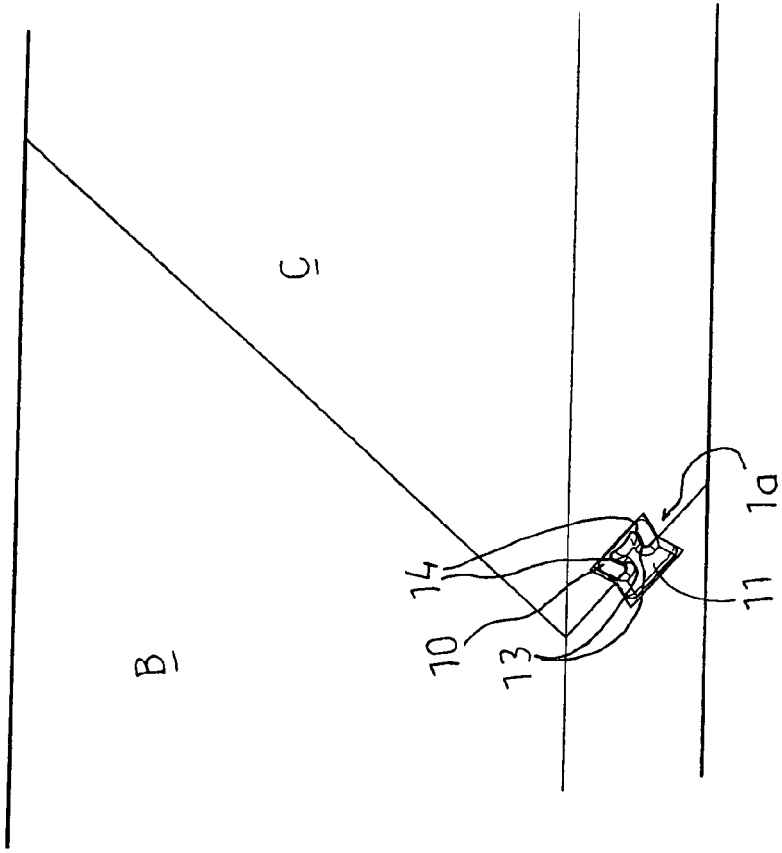
FIG. 6 shows panel components B and C connected together but with C in a (180 degree) flipped orientation to form a flat joint, according to an embodiment of the present invention.

FIG. 6 shows how panel component B can be connected to panel component C with a connector assembly 1a like connector assembly 1 but with panel component C in a (180 degree) flipped orientation, according to an embodiment of the present invention. This does away with the need for an angle adapter such as adapter 50.

Figure 7:
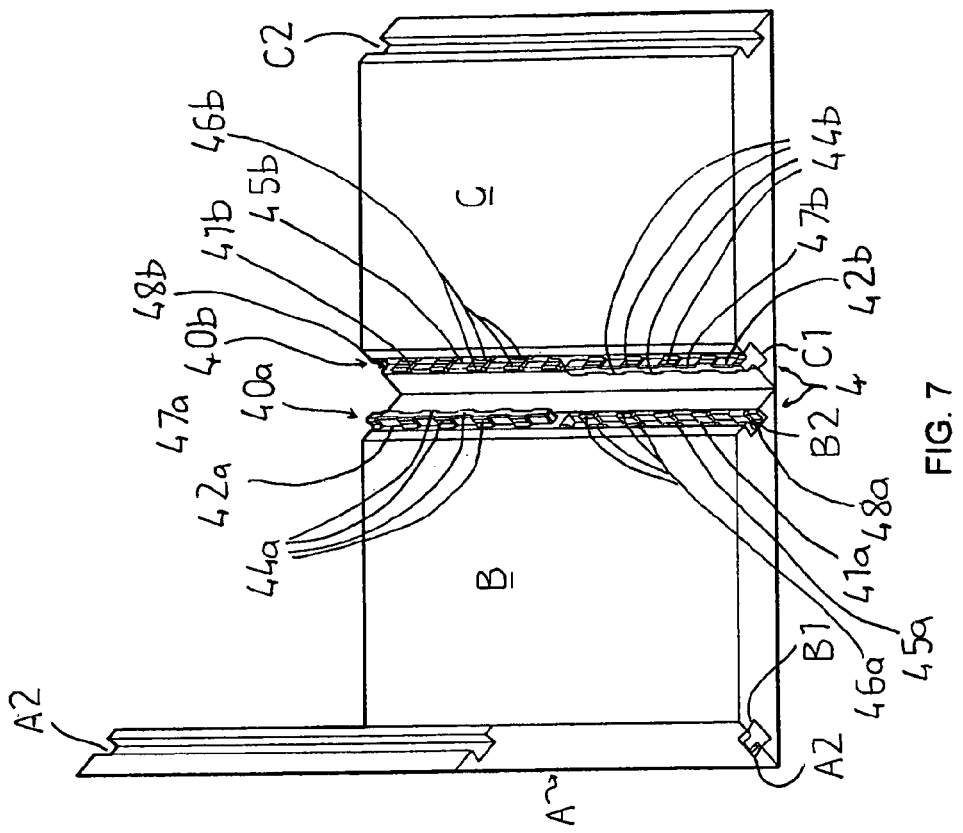
FIG. 7 shows panel components A, B and C, but with the components being connected together using a different type of (hybrid) connector assembly, according to an embodiment of the present invention.
Figure 8:
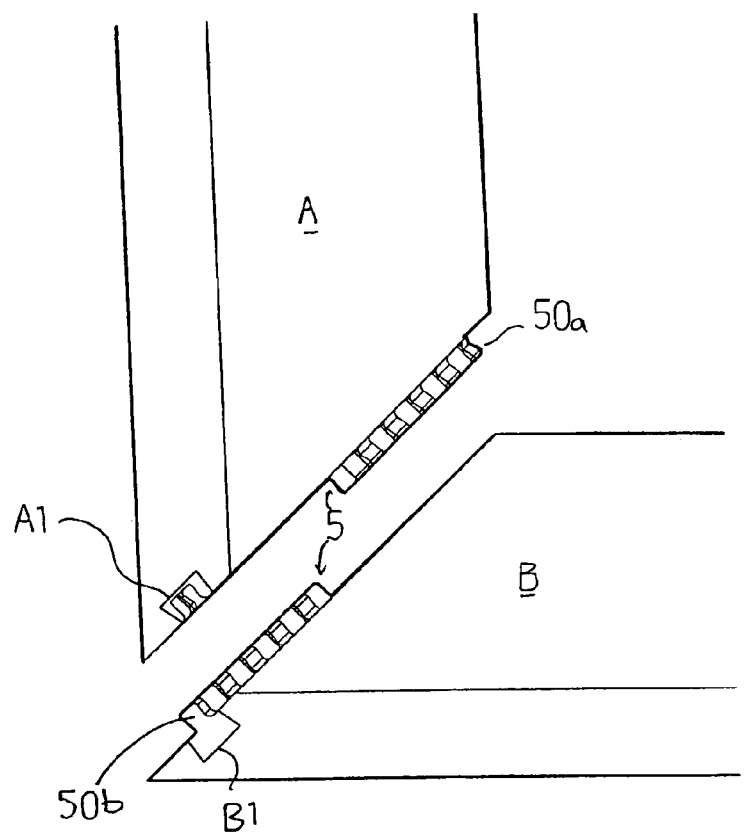
FIG. 8 is the same as FIG. 7 but showing panel components A and B being connected together with the type of connector assembly shown in FIG. 7.

FIGS. 7 and 8 show wooden panel components A, B and C that are in the process of being connected together to form two mitered joints using two hybrid connector assemblies 4, 5, according to an embodiment of the present invention.

Panel components A, B and C each have beveled edges (45° miter) that can be connected together with connector assemblies 4 and 5. A tapered groove A1, A2, B1, B2, C1, C2 extends along and within each beveled edge of A, B and C.

As seen in FIG. 7, connector assembly 4 comprises two hybrid connector pieces 40a and 40b that are substantially identical with one another. The pieces 40a and 40b are made of injection moulded plastics material and may have been cut/snapped from the one moulded strip.

Each hybrid connector piece 40a, 40b comprises a keyway connector portion 41a, 41b and a key connector portion 42a, 42b. Portions 41a and 42a or 41b and 42b are of substantially equivalent lengths and are connected end to end such that the one hybrid piece 40a, 40b can serve as both a keyway connector and key connector. As seen in FIG. 7, with piece 40a in a reversed orientation relative to piece 40b, the pieces 40a, 40b can engage one another to form a secure joint. This does away with the need to have distinct keyway and key connectors as shown in FIG. 1. The one hybrid piece 40a or 40b can carry out both functions.

Each keyway connector portion 41a, 41b comprises an elongate keyway body 45a, 45b having a longitudinal axis and keyways 46a, 46b spaced at regular intervals relative to one another along opposing longitudinal sides of the keyway body 45a, 45b that provide a longitudinal keyway passage 48a, 48b. The keyway body 45a, 45b is wedge-shaped/tapered when viewed on end. The keyways 46a, 46b are spaced such that a width of an interval between adjacent keyways 46a, 46b of a longitudinal side of the keyway body 45a, 45b is substantially of the same width as a width of each adjacent keyway 46a, 46b' (ie. one pitch length). The keyways 46a, 46b are spaced as off set opposing pairs relative to the longitudinal axis of the keyway body 45a, 45b. Each keyway 46a, 46b is in the form of a hook.

Each key connector portion 42a, 42b comprises an elongate key body 47a, 47b having a longitudinal axis and the keys 44a, 44b spaced at regular intervals relative to one another along opposing longitudinal sides of the key body 47a, 47b that are retainable by the keyways 46a, 46b. The key body 47a, 47b is wedge-shaped/tapered when viewed on end. The keys 44a, 44b are spaced such that a width of an interval between adjacent keys 44a, 44b of a longitudinal side of the key body 47a, 47b is substantially of the same width as a width of each adjacent key 44a, 44b (ie. one pitch length). The keys 44a, 44b are spaced as off set opposing pairs relative to the longitudinal axis of the key body 47a, 47b.

Each longitudinal side of the key body 47a, 47b has the keys 44a, 44b extending within the same plane and the keys 44a, 44b are spaced apart from one another in accordance with the off set spacing of the keyways 46a, 46b. With the keys 44a, 44b in this arrangement, the keys 44a, 44b can be slid into locking engagement with the keyways 46a, 46b or slid out of locking engagement with the keyways 46a, 46b. The keys 44a, 44b can be removed from the keyway passage 48a, 48b in a lateral direction when not in locking engagement with the keyways 46a, 46b. This can be achieved by moving each key 44a, 44b along the keyway passage 48a, 48b to a space between adjacent keyways 46a, 46b (ie. one pitch length). Each hybrid connector piece 40a, 40b is mounted within its tapered groove B2, C1 by way of friction and/or adhesive (glue) and/or fastener between the keyway body 47a, 47b and the groove B2, C1. In order to connect panel components B and C together to form a mitered joint as seen in FIG. 7, firstly each hybrid connector piece 40a, 40b is mounted within the tapered grooves B2, C1. The keys 44a, 44b are then extended into the keyway passage 48a, 48b and slid along the keyway passage 48a, 48b one pitch length until the keyways 46a, 46b engage and retain the keys 44a, 44b to form a secure joint. If desired, the components B, C can be further glued or otherwise fastened together.

FIG. 8 shows how wooden panel components A and B can be connected together using connector assembly 5. Connector assembly 5 is substantially identical to connector assembly 4 and works in the same way to provide a mitered joint. That is, connector assembly 5 comprises two hybrid connector pieces 50a and 50b, and with piece 50a in a reversed orientation relative to piece 50b, the pieces 50a, 50b can engage one another to form a secure joint.

Figure 9:
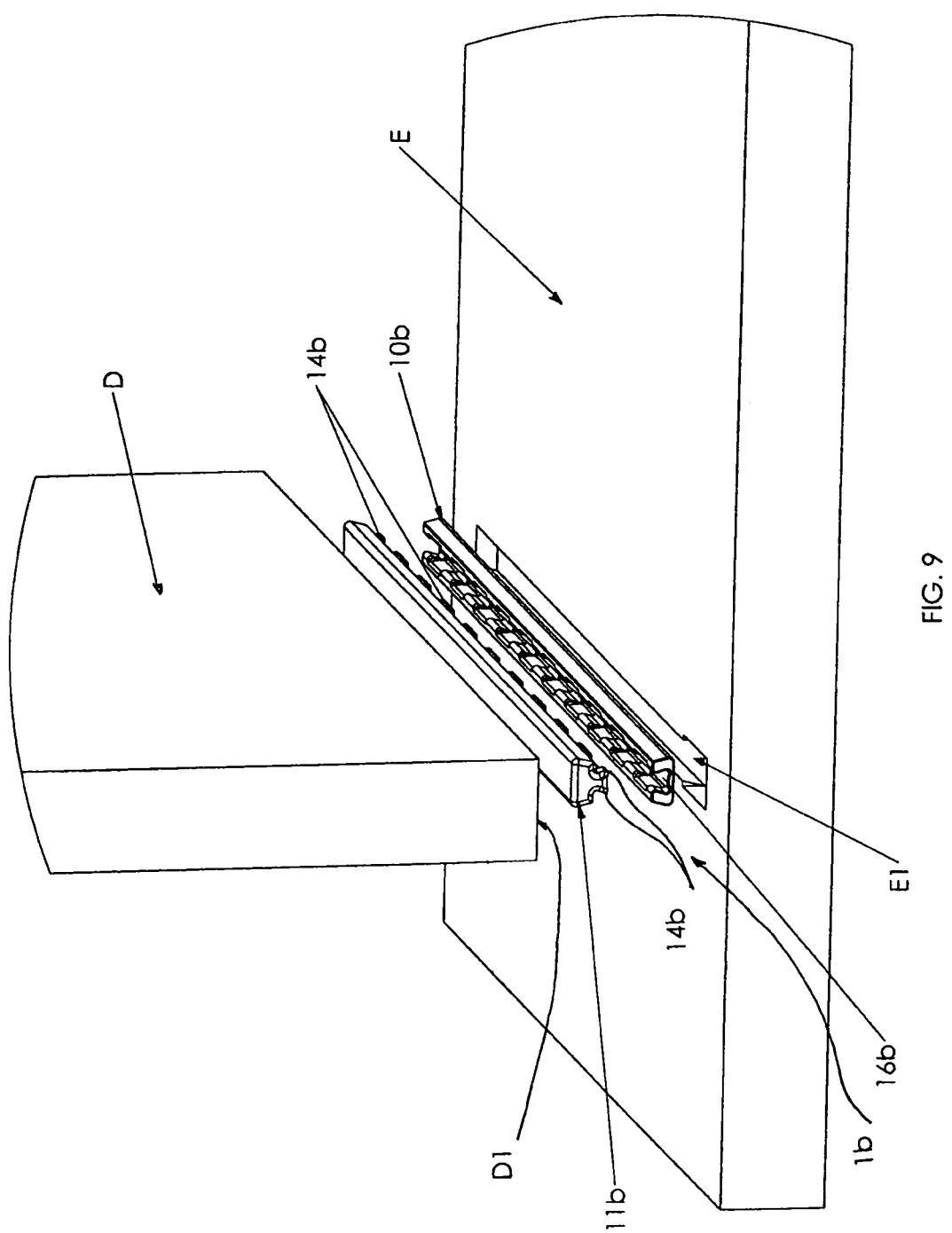
FIG. 9 is a perspective view of panel components D and E that are to be connected together using a connector assembly like that shown in FIG. 1, according to an embodiment of the present invention.

FIG. 9 shows how wooden panel component D can be connected to panel component E with a connector assembly 1b like connector assembly 1 but as a butt joint, according to an embodiment of the present invention. Panel component E has a groove E1 and panel component D has a non-beveled end also having a groove D1.

Connector assembly 1b comprises an elongate keyway connector 10b made of injection moulded plastics material and an elongate key connector 11b made of injection moulded plastics material. As described for connector 1, keyway connector 10b comprises regularly spaced keyways that provide a keyway passage 16b and the key connector 11b comprises regularly spaced keys 14b (only some of which have been labeled) that engage the keyways to lock the connectors 10b, 11b together to form a secure joint. Each keyway is in the form of a hook and each key 14b is shaped so as to be retained by the hook. The keyway connector 10b is mounted within the groove E1 using friction fit and/or staples and/or adhesive (glue), for example. Likewise, the key connector 11b is mounted within the groove D1 (in the non-bevelled end) by way of a friction fit and/or staples and/or adhesive (glue), for example.

In order to connect panel components D and E together to form a butt joint, firstly the keyway and key connectors 10b, 11b are mounted to the components D, E, within the grooves D1, E1. The keys 14b are then extended into the keyway passage 16b and slid along the keyway passage 16b one pitch length until the keyways 13b engage and retain the keys 14b to, form a secure butt joint. If desired, the components D, E can be further glued or otherwise fastened together.

FIG. 9 shows that grooves D1 and E1 can each be cut or molded into components D and E short of the edges or ends, such that they are not visible once the components D, E have been connected together and the joint has been made. That is, a semi-flexible key connector 11b and keyway connector 10b are fitted by hand into the tapered grooves E1, D1 by way of an enlarged entry point of any shape (for example square as shown or round by way of the router cutter diameter or other), to produce an aesthetically pleasing result as the connectors 10b, 11b and grooves E1, D1 will no longer be visible. This connecting mechanism also provides the advantage of preventing the key connector 11b and keyway connector 10b from sliding out of position during assembly, cyclic loading during life of the assembly, or during disassembly.

Figure 10:
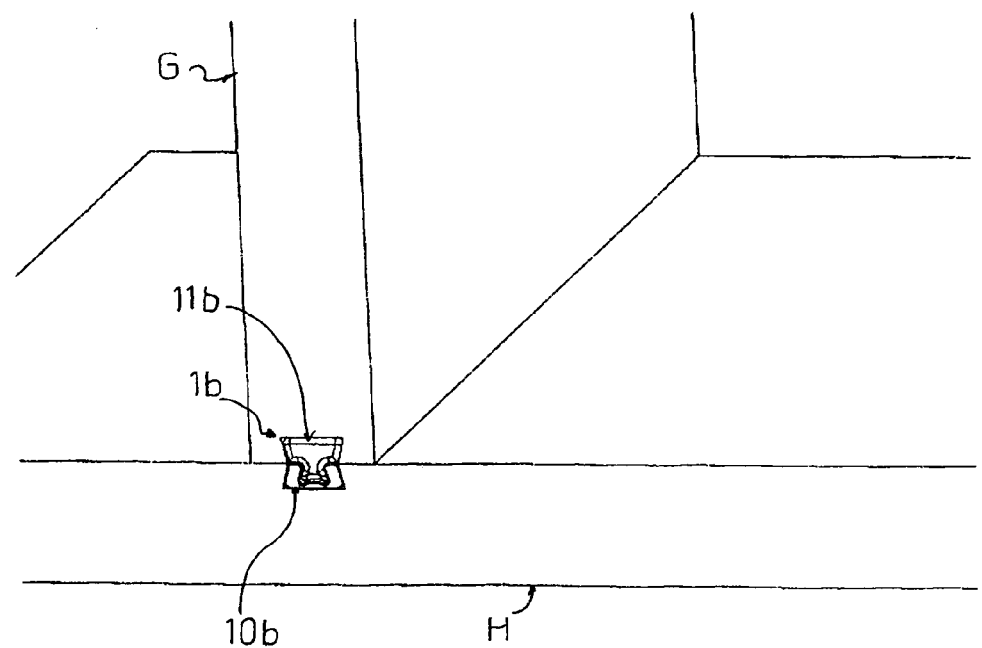
FIG. 10 is a perspective view of panel components G and H as well as a connector assembly like that shown in FIG. 9 when connected together, according to an embodiment of the present invention.

FIG. 10, on the other hand, shows components G and H (which are like components D and E) joined together but the grooves and keyway 10b and key 11b connectors extend to the very edges or ends of the components G, H. This is not as aesthetically pleasing as that shown in FIG. 9 and the connectors 10b, 11b could possibly slide out of position over time.

Referring now to FIGS. 11-13, there is shown a connector assembly 60 (as shown in FIG. 13) that is used to join two components together (or possibly two ends of the one component together). The connector assembly 60 comprises a keyway connector 61 (as seen in FIG. 11) and a key connector 62 (as seen in FIG. 12). Both connectors 61, 62 are made of plastics material.

The keyway connector 61 comprises regularly spaced keyways 63 (only some of which are labeled) and the key connector 62 comprises regularly spaced keys 64 (only some of which have been labeled) that engage the keyways 63 to lock the connectors 61, 62 together to form a secure joint. Each keyway 63 is in the form of a hook and each key 64 is shaped so as to be retained by the hook. The keyway connector 61 comprises an elongate hollow keyway body 65 having a longitudinal axis and the keyways 63 are spaced at regular intervals relative to one another along opposing longitudinal sides of the keyway body 65 so as to provide a longitudinal keyway passage 66. The keyway body 65 is rectangular when viewed on end and has plastics material-saving pockets 68 (only some of which have been labeled). The keyways 63 are spaced such that a width of an interval between adjacent keyways 63 of a longitudinal side of the keyway body 65 is substantially of the same width as a width of each adjacent keyway 63 (ie. one pitch length). The keyways 63 are spaced as opposing pairs relative to the longitudinal axis of the keyway body 65.

The key connector 62 comprises an elongate key body 67a,b having a longitudinal axis and the keys 64 are spaced at regular intervals relative to one another along opposing longitudinal sides of the key body 67a,b that are retainable by the keyways 63. The key body 67a,b comprises body regions 67a and 67b. Key body region 67b is generally rectangular when viewed on end. Key body region 67a extends from key body region 67b and further extends longitudinally adjacent and between pairs of keys 64. Key body region 67a is receivable within the keyway passage 66. Key body region 67b has plastics material-saving pockets 69 (only some of which have been labeled).

The keys 64 are spaced such that a width of an interval between adjacent keys 64 of a longitudinal side of the key body 67a,b is substantially of the same width, as a width of each adjacent key 64 (ie. one pitch length). The keys 64 are spaced as opposing pairs relative to the longitudinal axis of the key body 67a,b.

Each longitudinal side of the key body 67a,b has the keys 64 extending within the same plane and the keys 64 are spaced apart from one another in accordance with the spacing of the keyways 63. With the keys 64 in this arrangement, the keys 64 can be slid into locking engagement with the keyways 63 or slid out of locking engagement with the keyways 63. The keys 64 can be removed from the keyway passage 66 in a lateral direction when not in locking engagement with the keyways 63. This can be achieved by moving each key 64 along the keyway passage 66 to a space between adjacent keyways 63 (ie. one pitch length). The keyway connector 61 is mounted within a groove of a component by way of a friction fit and/or adhesive (glue) and/or other fastener between the keyway body 65 and the component. Likewise, the key connector 62 is mounted within a groove of a component by way of a friction fit and/or adhesive (glue) and/or other fastener between key body region 67b and the component.

Figure 14:
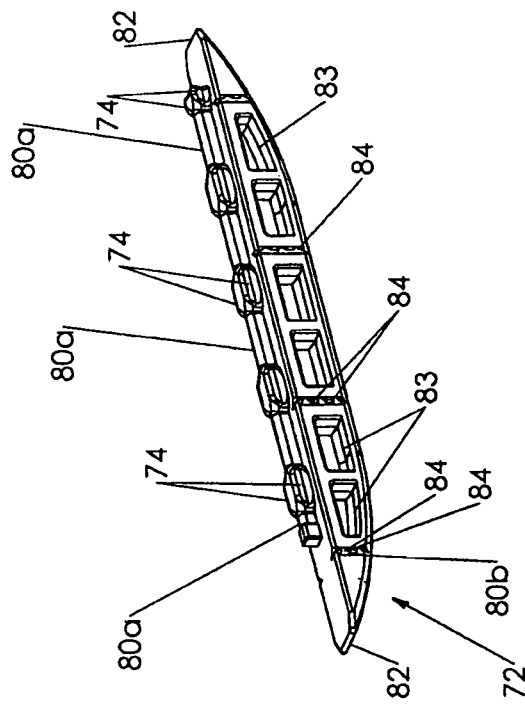
FIG. 14 is a perspective view of a keyway connector of a connector assembly (shown in FIG. 16) that is used to connect components together, according to an embodiment of the present invention.
Figure 15:
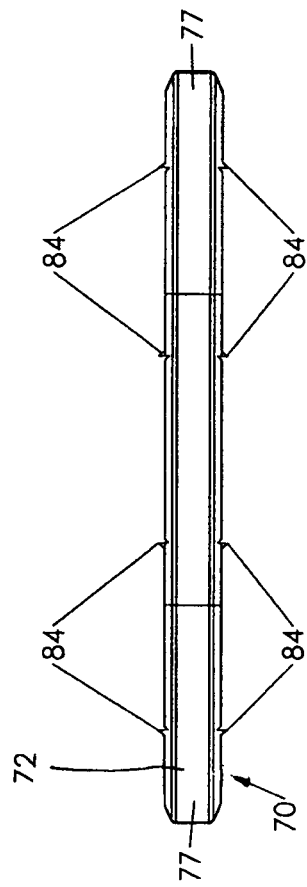
FIG. 15 is a perspective view of a key connector for use with the keyway connector shown in FIG. 14, according to an embodiment of the present invention.
Figure 16:
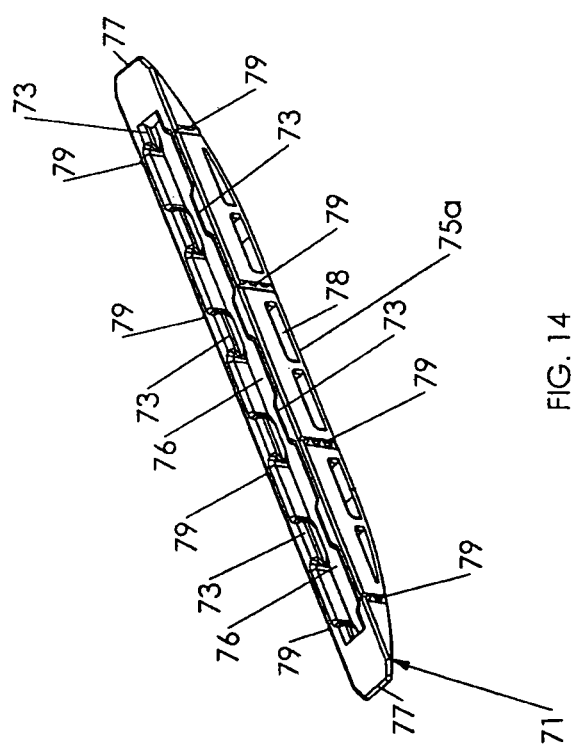
FIG. 16 is a perspective view of a connector assembly comprising the keyway connector of FIG. 14 and the key connector of FIG. 15, when connected together.
Figure 17:
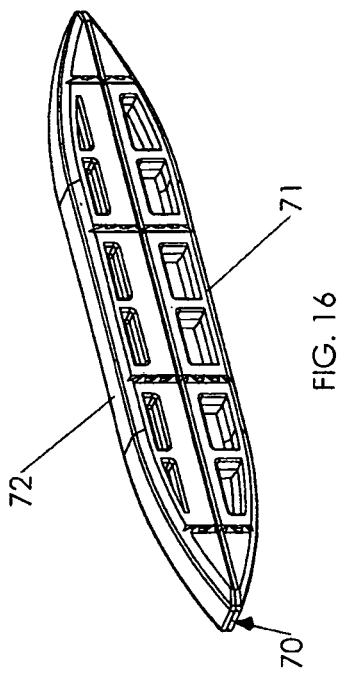
FIG. 17 is a plan view of that shown in FIG. 16.
Figure 19:
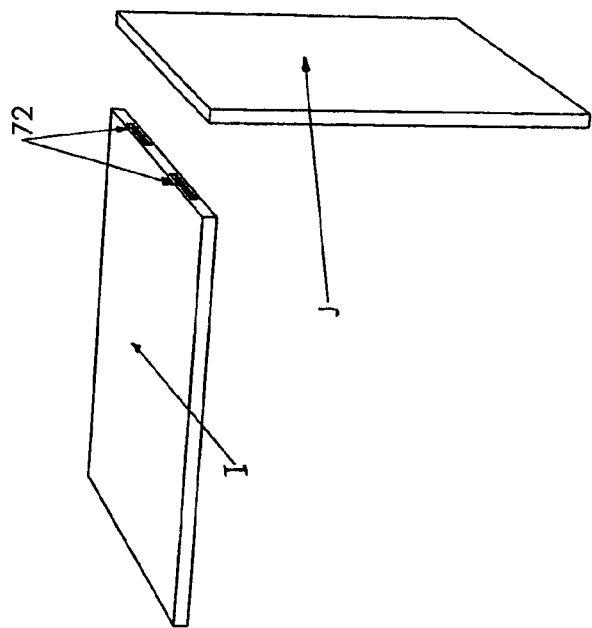
FIG. 19 is the same as FIG. 18 except showing the keyway connectors and key connectors fitted to the components.
Figure 20:
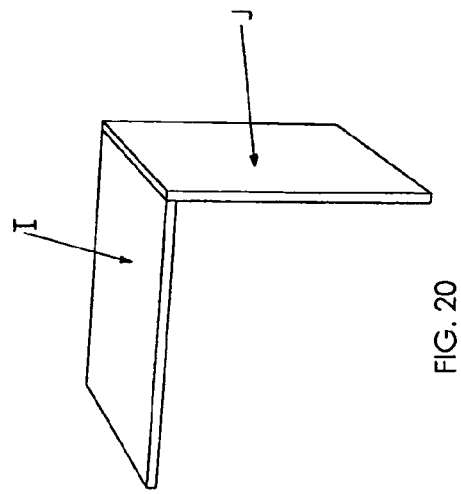
FIG. 20 is the same as FIG. 19 except showing the components joined together using the keyway connectors and key connectors.
Figure 18:
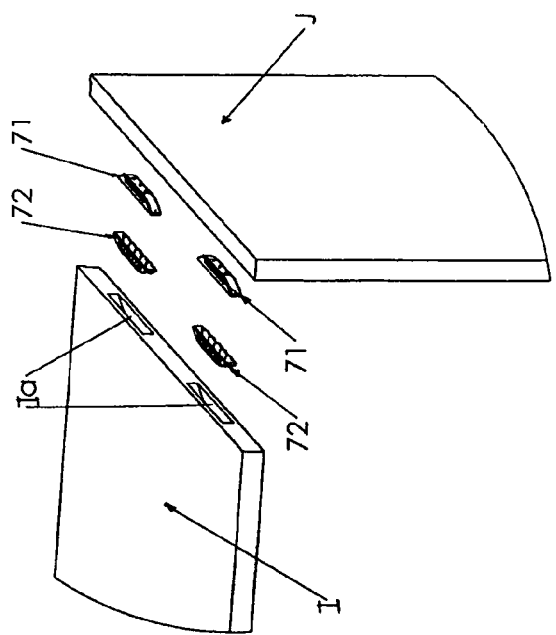
FIG. 18 is an exploded perspective view showing how two components can be joined together using two keyway connectors of FIG. 14 and two key connectors of FIG. 15.

Referring now to FIGS. 14-20, there is shown a connector assembly 70 (as shown in FIG. 16) that is used to join two components I, J together (as shown in FIGS. 18-20). The connector assembly 70 comprises a keyway connector 71 (as seen in FIG. 14) and a key connector 72 (as seen in FIG. 15). Both connectors 71, 72 are made of plastics material.

The keyway connector 71 comprises regularly spaced keyways 73 (only some of which are labeled) and the key connector 72 comprises regularly spaced keys 74 (only some of which have been labeled) that engage the keyways 73 to lock the connectors 71, 72 together to form a secure joint. Each keyway 73 is in the form of a hook and each key 74 is shaped so as to be retained by the hook.

The keyway connector 71 comprises an elongate keyway body 75 having a longitudinal axis and the keyways 73 are spaced at regular intervals relative to one another along opposing longitudinal sides of the keyway body 75 so as to provide a longitudinal keyway passage 76. The keyway body 75 has an arcuate longitudinal wall 75a with tapered ends 77, enabling fitment into an arcuate groove of component J that has been formed using a cutting wheel (as opposed to a router bit). Each longitudinal wall 75a of the keyway body 75 has plastics material-saving pockets 78 (only some of which have been labeled) as well as protruding barbs 79 (only some of which have been labeled). The keyways 73 are spaced such that a width of an interval between adjacent keyways 73 of a longitudinal side 75a of the keyway body 75 is substantially of the same width as a width of each adjacent keyway 73 (ie. one pitch length). The keyways 73 are spaced as opposing pairs relative to the longitudinal axis of the keyway body 75.

The key connector 72 comprises an elongate key body 80a,b having a longitudinal axis and the keys 74 are spaced at regular intervals relative to one another along opposing longitudinal sides of the key body 80a,b so as to be retainable by the keyways 73. The key body 80a,b comprises body regions 80a and 80b. Key body region 80a extends from key body region 80b and further extends longitudinally adjacent and between pairs of keys 74. Key body region 80a is receivable within the keyway passage 76.

The key body region 80b has an arcuate longitudinal wall with tapered ends 82, enabling fitment into an arcuate groove Ia of component I that has been formed using a cutting wheel. Each longitudinal side of key body region 80b has plastics material-saving pockets 83 (only some of which have been labeled) as well as protruding barbs 84 (only some of which have been labeled). The keys 74 are spaced such that a width of an interval between adjacent keys 74 of a longitudinal side of the key body 80a,b is substantially of the same width as a width of each adjacent key 74 (ie. one pitch length). The keys 74 are spaced as opposing pairs relative to the longitudinal axis of the key body 80a,b.

Each longitudinal side of the key body 80a,b has the keys 74 extending within the same plane and the keys 74 are spaced apart from one another in accordance with the spacing of the keyways 73. With the keys 74 in this arrangement, the keys 74 can be slid into locking engagement with the keyways 73 or slid out of locking engagement with the keyways 73. The keys 74 can be removed from the keyway passage 76 in a lateral direction when not in locking engagement with the keyways 73. This can be achieved by moving each key 74 along the keyway passage 76 to a space between adjacent keyways 73 (ie. one pitch length).

The keyway connector 71 is mounted within a groove of component J by way of a friction fit and/or adhesive (glue) and/or other fastener between the keyway body region 75a and the component J. The barbs 79 increase retention strength within the groove and resist lateral movement lengthways within the groove. Likewise, the key connector 72 is mounted within a groove Ia of component I by way of a friction fit and/or adhesive (glue) and/or other fastener between key body region 80b and the component. Again, the barbs 84 increase retention strength within the groove Ia and resist lateral movement lengthways within the groove Ia.

In order to connect components I and J together, the keyway connectors 72 and key connectors 71 are first securely fitted to their respective wheel-cut grooves of components I and J, as depicted in FIGS. 18 and 19. The components I, J are then brought together such that keys 74 extend with the keyway passages 76, following which they are slid into locking engagement with the keyways 73. At that point components I, J can be further glued or otherwise fastened together.

Although not illustrated, it is to be appreciated that the keyway connectors and/or key connectors as shown in any of the figures could be integral parts of the components themselves. That is, the components as shown in the figures could be moulded, cast, pressed, formed, machined or extruded with such keyway connectors and/or key connectors. Also, rather than joining separate components, two different regions of the one component may be joined using the keyway connectors and/or key connectors as shown in the figures.

The invention as exemplified has at least the following advantages:

The connector assembly can be readily and cost effectively manufactured as well as retrofitted/mounted to many different types components. Thus it has important advantages over the traditional tapered groove/dovetail joint.

The (castellated) keyway and key arrangement of the connector assembly enables secure joining of components by moving one component relative to the other only the distance of one key/keyway pitch length. This enables more accurate, more convenient and faster assemblage of, say, panel components, requiring much less room to align panel components that are being assembled than with the traditional method of sliding one narrowly retaining tongue into the entire length of a narrowing groove.

The (castellated) keyway and key arrangement provides a locking force that pulls the components together during assembly to create a strong, secure joint. This is not possible with a single traditional tapered groove running the length of the joint.

Compared with long established joinery processes, the connector assembly allow for much faster assembly of components, more efficient flat packing of components for storage and transport, and assemblage of components with less use of tools and fasteners (nuts and bolts, nails, adhesives etc). Also, the joints formed using the connector assembly can be permanent, reversible or reusable.

The connector assembly components can be fitted in such a way as to allow for intentional removal of the individual components for more efficient disassembly and recycling of all like or dislike materials.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

The invention claimed is:

1. A method of connecting at least two different regions of a component together or at least first and second components together using a connector assembly comprising an elongate keyway connector and an elongate key connector, wherein
the keyway connector comprises an elongate keyway body having a longitudinal axis and a plurality of keyways spaced at regular intervals relative to one another along opposing longitudinal sides of the keyway body, wherein the keyway body and keyways are of unitary construction and the regularly spaced keyways provide a continuous longitudinal keyway passage, and wherein each said keyway has a key-retaining portion, and wherein the key connector comprises an elongate key body having a longitudinal axis and a plurality of keys spaced at regular intervals relative to one another along opposing longitudinal sides of the key body that are retainable by the keyways, wherein said method comprises the steps of:

mounting the keyway body and key body within a respective longitudinal groove of the component having at least two different regions or within a respective longitudinal groove of the first and second components; and sliding the regularly spaced keys longitudinally within the keyway passage to individually engage the key-retaining portions of the keyways, to pull and lock the connectors together to form the connector assembly and connect the component having at least two different regions together or the at least first and second components together, wherein said keyway body and said key body are each able to be received as a longitudinal tongue within a said longitudinal groove of the component having at least two different regions or the at least first and second components;

said keyways are spaced such that a width of an interval between adjacent said keyways of a said longitudinal side of the keyway body is substantially of the same width as a width of each adjacent said keyway;

said keys are spaced such that a width of an interval between adjacent said keys of a said longitudinal side of the key body is substantially of the same width as a width of each adjacent said key; and when individually engaged, the width of each said key and key-retaining portion is substantially the same, and the width of said key substantially engages the width of said key-retaining portion.

2. The method of claim 1, wherein at least one said elongate keyway connector is mountable to or part of the at least first component, wherein at least one said elongate key connector is mountable to or part of the at least second component, and said method is capable of mechanically connecting two or more said components together.

3. The method as defined in claim 2, wherein said first and second components are two different regions of the one and the same component.

4. The method as defined in claim 2, wherein the first and second components are connected end to end.

5. The method as defined in claim 2, wherein the first and second components are panels.

6. The method as defined in claim 2, wherein the first and second components are arcuate.

7. The method as defined in claim 1, wherein each said keyway is in the form of a hook and each said key is shaped so as to be retained by the hook.

8. The method as defined in claim 1, wherein said keyways are spaced as opposing pairs relative to the longitudinal axis of the keyway body and said opposing pairs are wedge-shaped when the keyway connector is viewed in end elevation.

9. The method as defined in claim 8, wherein said key-retaining portions of each said opposing pair slope towards one another when viewed in end elevation.

10. The method as defined in claim 9, wherein the slope extends substantially parallel with the longitudinal axis of the keyway body.

11. The method as defined in claim 9, wherein the slope extends substantially transversely of the longitudinal axis of the keyway body.

12. The method as defined in claim 1, wherein the keys are spaced as opposing pairs relative to the longitudinal axis of the key body and said opposing pairs of keys are wedge-shaped when the key connector is viewed in end elevation.

13. The method as defined in claim 12, wherein the keys of each said opposing pair of keys slope towards one another when viewed in end elevation.

14. The method as defined in claim 13, wherein the slope of each said key extends substantially parallel with the longitudinal axis of the key body.

15. The method as defined in claim 13, wherein the slope of each said key extends substantially transversely of the longitudinal axis of the key body.

16. The method as defined in claim 1, wherein an overall size and shape of the elongate keyway body and elongate key body are substantially the same.

17. The method as defined in claim 1, wherein the grooves of the component having at least two different regions or the grooves of the first and second components are of substantially identical cross-section.

18. The method as defined in claim 1, wherein said keyway body and said key body are each arcuate when viewed in side elevation.

19. The method as defined in claim 1, wherein each said longitudinal groove is arcuate.

20. The method as defined in claim 1, wherein each said longitudinal groove is formed using a cutting wheel.

* * * * *